UNITED STATES PATENT OFFICE.

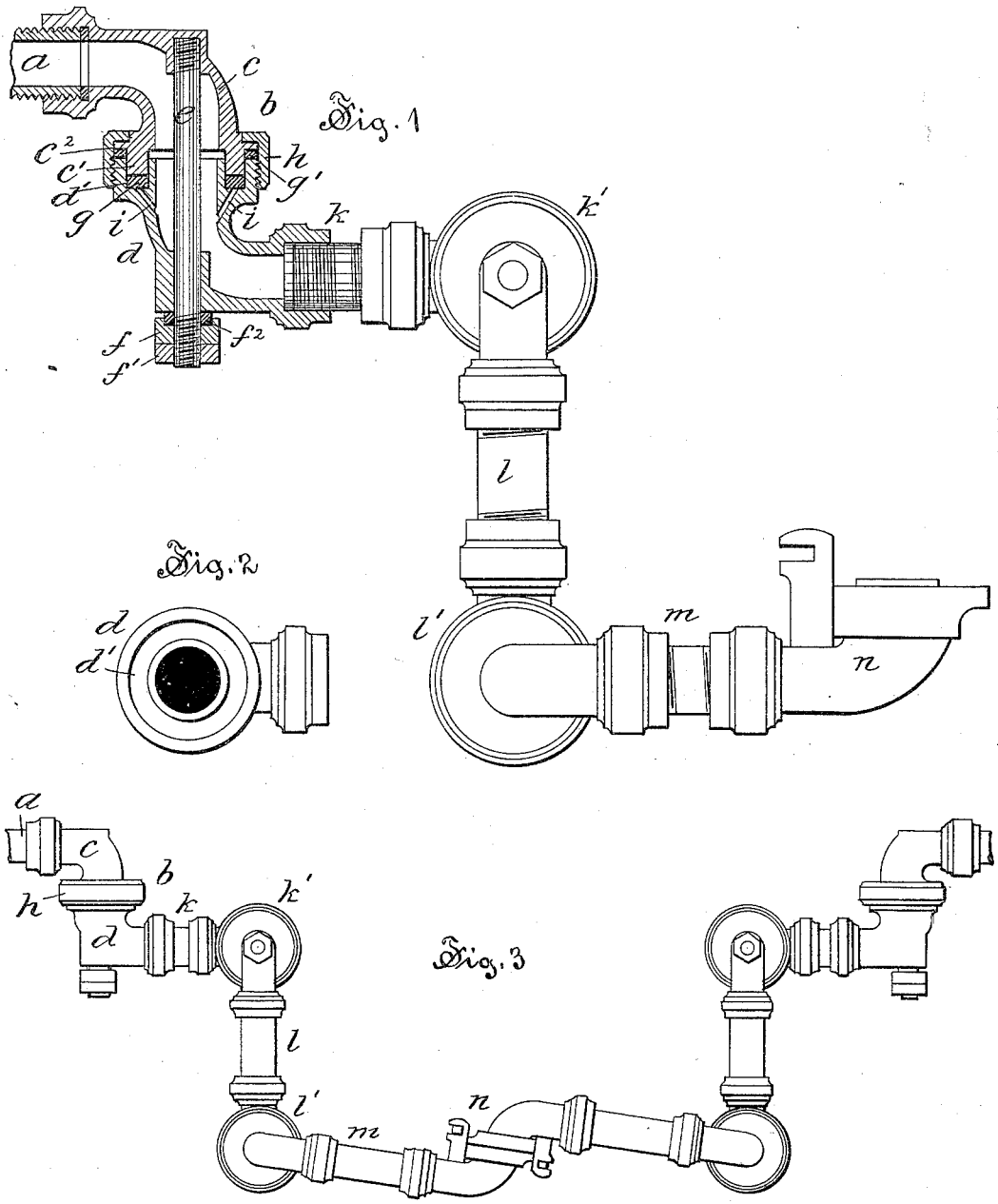

DANIEL W. MAGEE, OF NEW YORK, N. Y.

FLEXIBLE PIPE-JOINT.

SPECIFICATION forming part of Letters Patent No. 409,216, dated August 20, 1889.

Application filed April 4, 1887. Serial No. 233,588. (No model.)

*To all whom it may concern:*

Be it known that I, DANIEL W. MAGEE, of the city, county, and State of New York, have invented certain new and useful Improvements in Flexible Pipe-Joints, of which the following is a full, clear, and exact description, whereby any one skilled in the art can make and use the same.

My invention relates to the class of devices that are adapted for use on rigid pipes for the purpose of making the same flexible; and my object is to provide a joint that while it is sufficiently yielding to make the pipe to which it is fitted practically flexible will remain at the same time steam-tight.

My improvement consists in the combination of the body parts of the joint, the one part having a groove to receive a projecting tongue on the other, with a rod extending through and within the parts, whereby they may be drawn firmly together and the packing interposed between the bearing-faces; and it further consists in the combination, with the pipe system, of a railway-car terminating in a pipe made flexible by the use of the within-described joint and terminating in a coupling of peculiar construction, as more particularly hereinafter described, and pointed out in the claim.

Referring to the accompanying drawings, Figure 1 is a detail side view of a jointed pipe made flexible by the use of my improved joint. Fig. 2 is a detail face or plan view of the bearing-face of one part of the joint. Fig. 3 is a diagram view of a coupled pipe made flexible by the use of my improved joint.

The pipe-fittings that form the subject-matter of my within-described invention are especially intended and are adapted for use on the heating or brake systems of railway-cars, and in the drawings the letter $a$ denotes the steam-pipe, to the end of which, usually just under the platform of the car, is secured the joint $b$. This joint $b$ is made up of the body parts $c$ and $d$, the former being a curved joint of a quarter-turn and having on its lower end a bearing-face with an annular projection $c'$, and on the outside of this projection is a flat bearing-surface $c^2$. The body part $d$, that is likewise a quarter-turn piece or elbow, has on its bearing-face an annular socket $d'$, into which the projection $c'$ is adapted to fit. These body parts are held together by means of the bolt $e$, that is secured to one part, as $c$, and extends through the center of the joints, passing through the other body part $d$, and projecting beyond it a sufficient distance to receive the clamping-nuts $f$ $f'$, and this bolt forms in part the pivot on which the two body parts turn, although the joint is in part supported by the intermeshing parts on the bearing-face between the two body parts of the joint.

The packing $g$ is located in the socket $d'$, and another annular packing $g'$ is placed upon the bearing-surface $c^2$.

A screw-cap $h$ is fitted upon the body part $c$, and has a screw-thread that is fitted upon a thread cut upon the outer surface of the body part $d$, and the function of this screw-cap is to aid in preserving the alignment of the parts and to keep the packing $g'$ in place, while also serving in a measure to hold the body parts together.

The body part $d$ is provided with a number of ducts $i$, that are small openings leading from the steamway in the body part $d$ backward into the annular chamber $d'$, and are intended to allow the steam to pass into contact with and to moisten the packing in the chamber.

In order to prevent the leakage of steam, the packing $f^2$ is placed between the under surface of the nut $f$ and a bearing-surface on the body part $d$.

In adapting this joint for use on a car there are three lengths of pipe beyond the first joint, already described and shown in section in the drawings, the length $k$ standing in a horizontal position, the length $l$ in a vertical position, and the length $m$ in a horizontal position when the couplings $n$ are united; but at other times the weight of the joint $m$ causes it to hang in a vertical position and allow the free outlet through the pipe of any steam, vapor, or water.

Of course it will be understood that each of the joints $k'$ $l'$ is constructed as the other joint already described. The joint attached to the end of the pipe $a$ is operated when the cars are running on a curve, while the joints $k'$ and $l'$ come into operation in uniting the pipes on cars of different heights, and they also provide for the varying distance between the cars that is caused by the different kinds of couplings used or by the movement of the cars around curves, the pipes usually lying on one side of the center of the car, so that when they turn to the right one side of the coupling is extended, while the other is contracted, and in turning to the left the reverse is the effect.

I claim as my improvement—

In combination with a number of lengths of rigid pipe, a joint composed of a body part $c$, forming a quarter-turn, with its bearing-face having an annular projection $c'$, the body part $d$, with an annular socket $d'$ in its bearing-face, and the supplemental ducts $i$, leading from the annular chamber into the steam-way, the bolt $e$, rigidly secured within one part and extending through the opposite wall of the other part and forming the central pivot of the joint, a screw-cap $h$, and the ring-packing $g$ and $g'$, all substantially as described.

DANIEL W. MAGEE.

Witnesses:
 CHAS. L. BURDETT,
 A. B. JENKINS.